(No Model.)
J. A. TILDEN.
WATER METER.
No. 575,743. Patented Jan. 26, 1897.
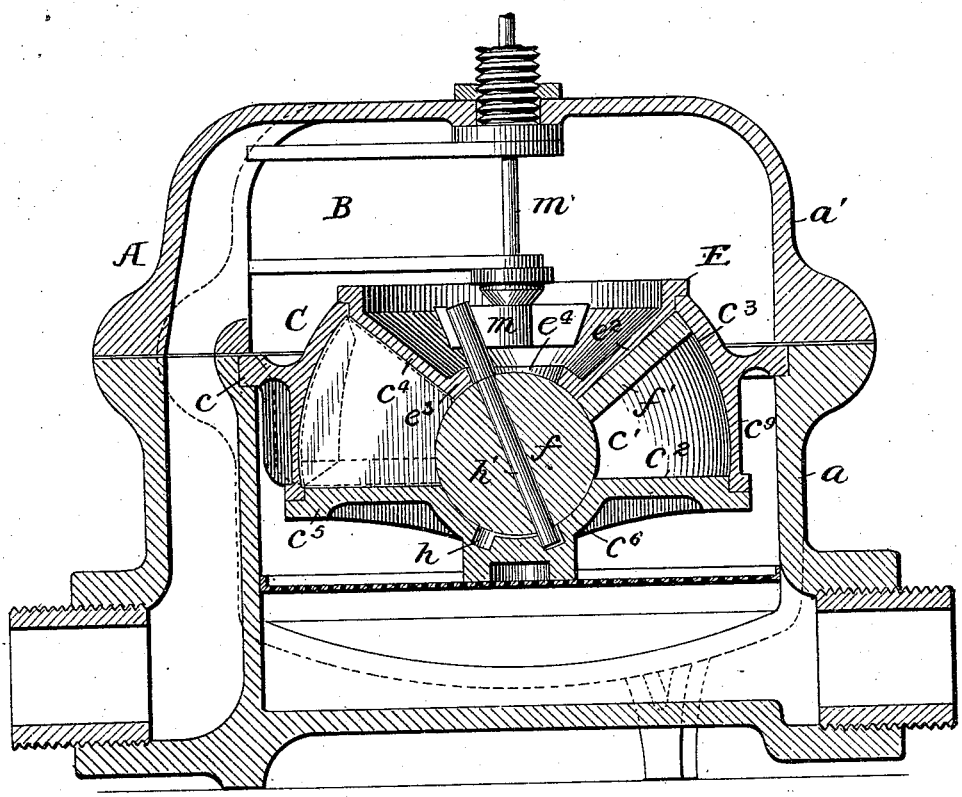
Witnesses
J. G. Hinkel
[signature]
Inventor
James A. Tilden
by [signature]
Attorney

UNITED STATES PATENT OFFICE.

JAMES A. TILDEN, OF HYDE PARK, MASSACHUSETTS, ASSIGNOR TO THE HERSEY MANUFACTURING COMPANY, OF PORTLAND, MAINE, AND BOSTON, MASSACHUSETTS.

WATER-METER.

SPECIFICATION forming part of Letters Patent No. 575,743, dated January 26, 1897.

Application filed December 30, 1891. Serial No. 416,550. (No model.)

*To all whom it may concern:*

Be it known that I, JAMES A. TILDEN, a citizen of the United States, residing at Hyde Park, in the county of Norfolk, State of Massachusetts, have invented a new and useful Improvement in Water-Meters, of which the following is a full, clear, and exact description, reference being had to the accompanying drawing, forming a part of this specification, in explaining its nature.

This invention relates to that class of meters known as "disk meters;" and it consists, essentially, in a disk water-meter having a disk normally operating in gyratory equilibrium, combined with a mechanical control to prevent abnormal operations.

In carrying out this invention I employ a mechanically-controlled equilibrium-disk. This is a type of disk in which the center of gyration does not coincide with the center of gravity, but is materially removed therefrom, generally in a direction perpendicular to the center of the disk. While such a disk would in certain positions be statically unbalanced, it would be capable of maintaining under favorable conditions an operative or gyratory equilibrium—that is, the centrifugal force which would arise from the absence of coincidence of the gyratory and gravity centers would tend to force or operate the disk in equilibrium against the plates or surfaces upon which it should operate to effect closure. To insure its movement in its proper path, I also provide this equilibrium-disk with a mechanical control, as hereinafter described.

A meter having a mechanically-controlled equilibrium-disk has advantages over one in which the disk is statically balanced and is held positively in place by a mechanical control, in that the wear upon the various bearings is very much decreased and the life of the meter consequently lengthened, while the accuracy of the controlled balanced disk construction is maintained, and it has advantages over the class of meters employing an uncontrolled equilibrium-disk, in that being always held by a positive mechanical control in operative position or relation to the ports and wall of the measuring-chamber and being compelled to take a defined and controlled course in relation thereto it cannot, by any shock or other cause, assume an inoperative position or become non-active and non-registering or have any other of the freaks of an uncontrolled equilibrium-disk.

In the drawing the figure is a vertical central section of a meter embodying my invention.

I do not consider it necessary to specifically describe all the details of construction of the meter illustrated, as these features are well understood by those skilled in the art, and it is only necessary to say that A represents an outer case, made in two parts $a$ $a'$, forming without the inner case a large chamber B, which is divided into two parts by the inner case C and its laterally-extending flange $c$. The inner case C contains the disk-chamber $c'$, which preferably has the flat lower surface or bottom $c^2$, the spherically-curved side wall $c^3$, and the downwardly-extending conical top $c^4$. The case is constructed of three parts in the present instance—viz., the base-plate $c^5$, which has a central downwardly-rounded depression $c^6$, forming a disk-bearing, the side wall $c^9$, having the flange $c$, and an upper plate E, having a downwardly-extended conical section $e^2$, the inner surface of which forms the top of the disk-chamber and which ends above the upwardly-curved central section $e^3$, having an opening $e^4$.

The disk comprises the ball $f$, and the thin conical plate or section $f'$, extending conically from the ball. The disk-chamber $c'$ is divided by a diaphragm in the usual way. At the lower end of the lower bearing $c^6$ there is formed in the bottom plate the inclined circular track $h$, into which extends the axis $h'$ of the disk-ball, the opposite end of the axis extending through the hole $e^4$ in the upper plate E and bearing against a short lever $m$ on the lower end of the spindle $m'$, connected with the reducing mechanism of the registering train. Preferably the diameter of that part of the axis $h'$ in the track $h$ is somewhat less than the width of the track, so that the axis may not cramp as it traverses the groove. The object of this axis and track is to maintain the disk in mechanically-controlled relation to the case and to the ports and wall of the case, so that it is compelled to travel or move in a given track, which is the track in which it should move to properly and accurately coact with the ports and wall in its measuring function. The equilibrium-disk thus mechanically held, guided, and controlled in the disk-chamber cannot be dislodged by shock, and reduces friction and wear to a minimum.

It will be seen that the disk and the disk-chamber are so shaped and proportioned to each other that the disk is held in its proper contacts by the least requirement of positive holding action, that is, the center of gyration and center of gravity do not coincide, so that the wear of the parts is reduced to a minimum and without in any way interfering with the efficiency of its operation or the liability of its non-action.

I have herein referred to the disk as an "equilibrium-disk." I do not want to be understood, however, as meaning a disk which is in a state of equilibrium when at rest, but a disk which, when in action under the influence of the water pressures and currents, maintains itself in what may be termed a "state of gyrating equilibrium," in that it is capable of preserving its course fairly well while under such conditions, but which, by the aid of additional mechanical controlling devices, is not only caused to keep its course while working, but is also held in operative position when the water is at rest or the meter is empty. In other words, I take a form of disk-chamber and disk which requires the slightest degree of mechanical force to maintain its contacts when working and add to them a mechanical device which positively controls its action while so working, and thereby combine the accuracy of a mechanically-controlled device with the least possible wear upon the mechanical connection, a very desirable result to reach in this class of meter.

What I claim is—

In a disk water-meter, a disk normally operating in gyratory equilibrium, combined with a mechanical control to prevent abnormal operations, substantially as described.

JAMES A. TILDEN.

Witnesses:
F. F. RAYMOND, 2d,
J. M. DOLAN.